(12) United States Patent
Sugiyama

(10) Patent No.: US 12,019,349 B2
(45) Date of Patent: Jun. 25, 2024

(54) OPTICAL DEVICE AND OPTICAL TRANSCEIVER USING THE SAME

(71) Applicant: Fujitsu Optical Components Limited, Kawasaki (JP)

(72) Inventor: Masaki Sugiyama, Kawasaki (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 73 days.

(21) Appl. No.: 17/167,564

(22) Filed: Feb. 4, 2021

(65) Prior Publication Data

US 2021/0356836 A1 Nov. 18, 2021

(30) Foreign Application Priority Data

May 15, 2020 (JP) .................................. 2020-085978

(51) Int. Cl.
*G02F 1/035* (2006.01)
*G02F 1/225* (2006.01)

(52) U.S. Cl.
CPC .......... *G02F 1/2255* (2013.01); *G02F 1/0356* (2013.01); *G02F 2201/127* (2013.01)

(58) Field of Classification Search
CPC ...... G02F 1/2255; G02F 1/0356; G02F 1/212; G02F 1/035; G02F 1/225
USPC ....................................................... 385/1–3
See application file for complete search history.

(56) References Cited

U.S. PATENT DOCUMENTS

| | | | |
|---|---|---|---|
| 5,208,697 A | 5/1993 | Schaffner et al. | |
| 6,801,675 B2 * | 10/2004 | Doi ........................ | G02F 1/2255 |
| | | | 385/9 |
| 7,079,714 B2 * | 7/2006 | Chowdhury .......... | G02F 1/2255 |
| | | | 385/40 |
| 8,600,197 B2 * | 12/2013 | Oikawa ................. | G02F 1/0356 |
| | | | 385/2 |
| 2009/0324156 A1 * | 12/2009 | Kinpara ................ | G02F 1/0356 |
| | | | 385/2 |
| 2010/0034496 A1 | 2/2010 | Oikawa et al. | |
| 2010/0046880 A1 * | 2/2010 | Oikawa ................. | G02F 1/2255 |
| | | | 385/2 |
| 2010/0158540 A1 | 6/2010 | Takabayashi | |

(Continued)

FOREIGN PATENT DOCUMENTS

| | | | | |
|---|---|---|---|---|
| CN | 107957631 A | * | 4/2018 | ............. G02F 1/035 |
| JP | 7-191352 A | | 7/1995 | |

(Continued)

OTHER PUBLICATIONS

"Lithium niobate ridge waveguides and modulators fabricated using smart guide" by Rabiei et al, Appl. Phys. Lett., vol. 86, paper 161115 (Year: 2005).*

(Continued)

*Primary Examiner* — Robert Tavlykaev
(74) *Attorney, Agent, or Firm* — STAAS & HALSEY LLP

(57) ABSTRACT

An optical device includes an optical waveguide formed of a crystal thin film having an electro-optic effect, an RF electrode configured to apply a high-frequency voltage to the optical waveguide, and a DC electrode configured to apply a DC voltage to the optical waveguide, wherein the RF electrode has a coplanar electrode configuration, and the DC electrode has a microstrip electrode configuration.

13 Claims, 13 Drawing Sheets

(56) References Cited

U.S. PATENT DOCUMENTS

| | | | | |
|---|---|---|---|---|
| 2011/0188799 A1* | 8/2011 | Sugiyama | ............. | G02F 1/0123 |
| | | | | 385/3 |
| 2016/0313579 A1* | 10/2016 | Yokoyama | .............. | G02F 1/365 |
| 2019/0033542 A1* | 1/2019 | Epitaux | ................ | G02B 6/4226 |
| 2020/0218126 A1 | 7/2020 | Iwatsuka et al. | | |
| 2021/0199997 A1* | 7/2021 | Okahashi | .............. | G02F 1/0356 |

FOREIGN PATENT DOCUMENTS

| | | | | | |
|---|---|---|---|---|---|
| JP | 3638300 | * | 1/2005 | ............. | G02F 1/313 |
| JP | 2008-89936 A | | 4/2008 | | |
| JP | 2008-250080 A | | 10/2008 | | |
| JP | 2010-97032 A | | 4/2010 | | |
| JP | 2010-145973 A | | 7/2010 | | |
| JP | 2013-238785 | | 11/2013 | | |
| JP | 2014-10189 A | | 1/2014 | | |
| JP | 2016-14698 | | 1/2016 | | |
| JP | WO2019/069815 | * | 4/2019 | ............. | G02F 1/035 |
| WO | WO 2019/039215 A1 | | 2/2019 | | |

OTHER PUBLICATIONS

Lecture 8 "Electric Currents Resistance & Resistivity", Physics 272 course, University of Hawaii (Year: 2010).*
Japanese Office Action dated Oct. 10, 2023 for Japanese Application No. 2020-085978.
Chinese Office Action dated Dec. 27, 2023 in corresponding Chinese Application No. 202110140643.6.
JP Office Action dated Feb. 27, 2024 for Japanese Application No. 2020-085978.

* cited by examiner

FIG.2 RELATED ART
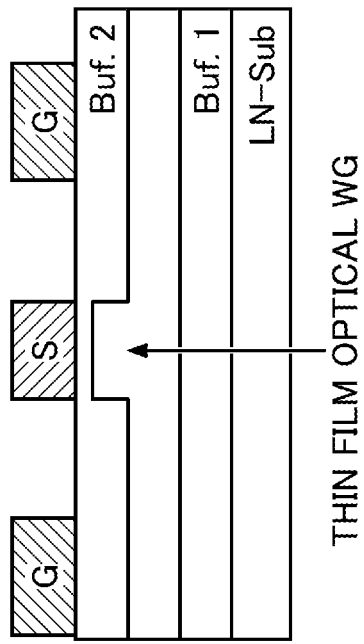
CROSS-SECTION OF DC ELECTRODE
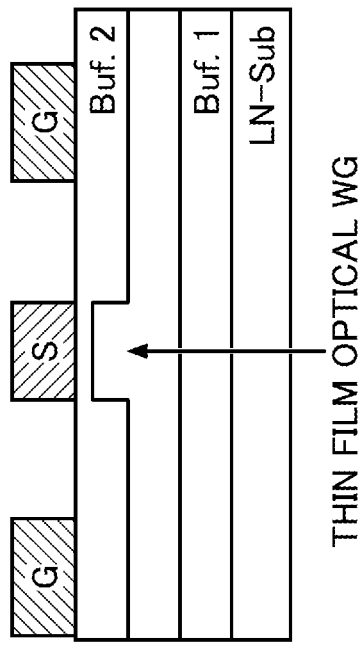
CROSS-SECTION OF RF ELECTRODE

FIG.4A
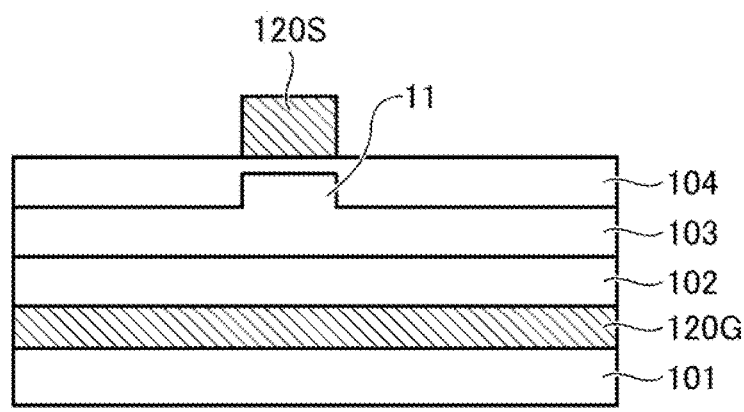
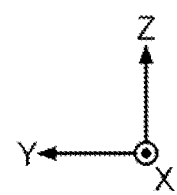
FIG.4B
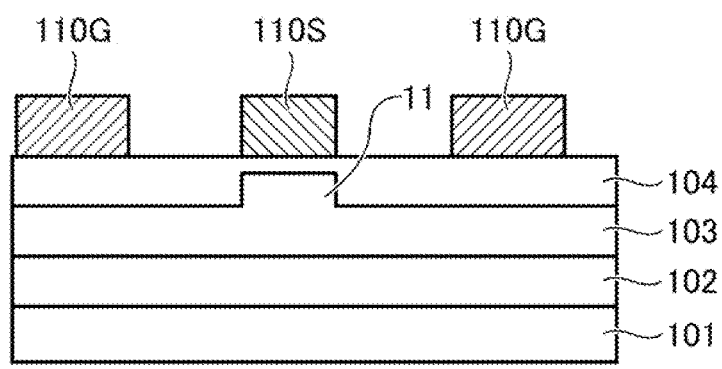
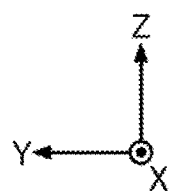

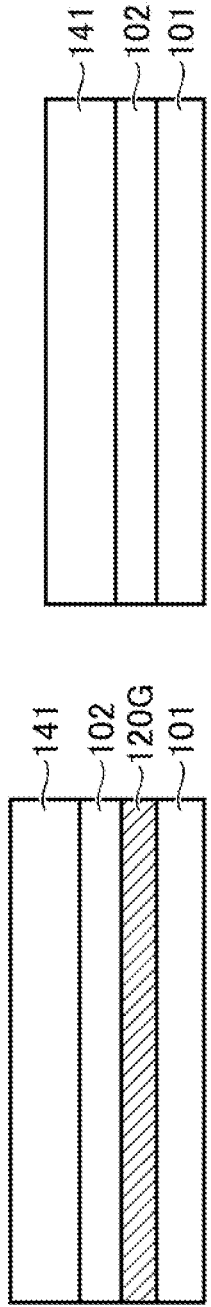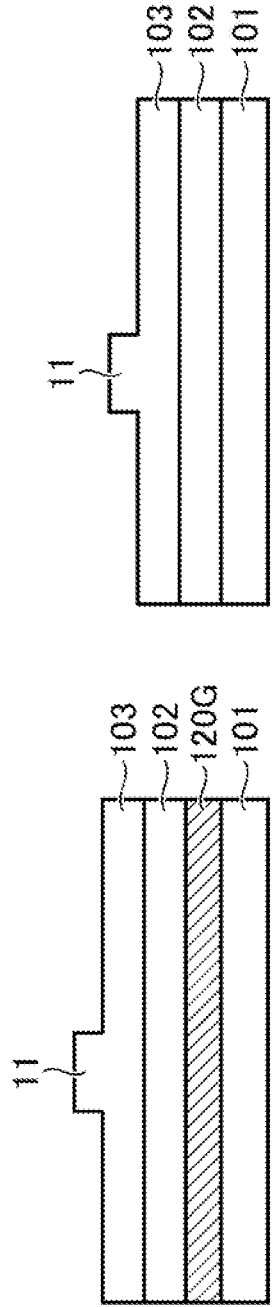

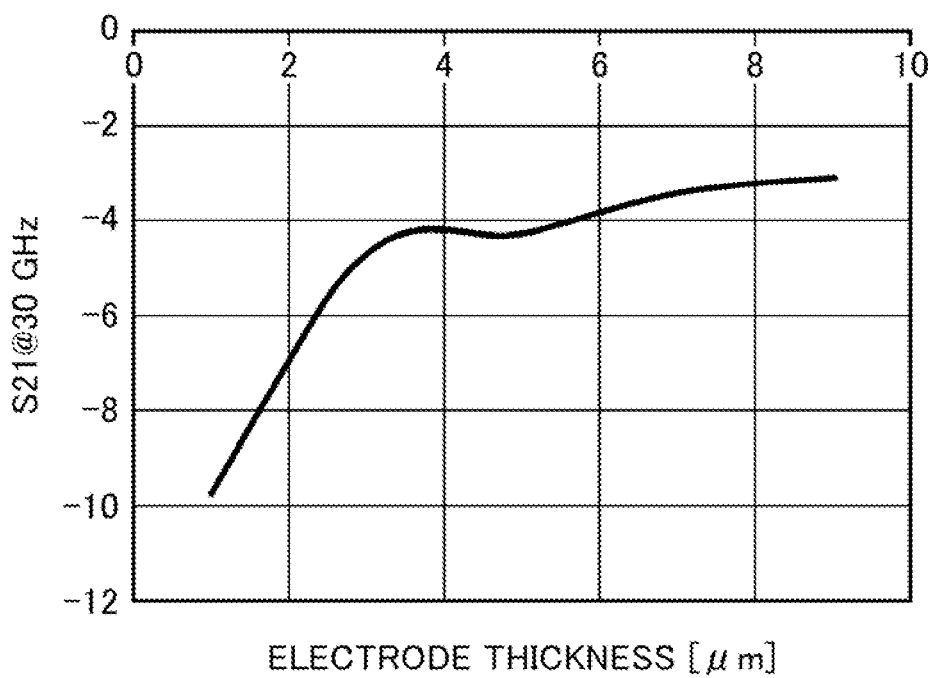

OPTICAL DEVICE AND OPTICAL TRANSCEIVER USING THE SAME

CROSS-REFERENCE TO RELATED APPLICATIONS

This application is based upon and claims priority to earlier Japanese Patent Application No. 2020-085978 filed May 15, 2020, which is incorporated herein by reference in its entirety.

FIELD

The present disclosure relates to an optical device and an optical transceiver using the same.

BACKGROUND

In a transmitter front-end circuit for optical data communication, an optical modulator for modulating a light beam with a data signal is used. FIG. 1 is a schematic diagram of an on-chip optical modulator formed on a Z-cut lithium niobate (LN) substrate. The Z-cut LN substrate is acquired by cutting a crystal bulk along a plane perpendicular to the crystal orientation (i.e., the c-axis). A signal electrode "S" is provided, via a buffer layer (labelled as "Buf." in the figure), above the optical waveguide WG formed in the surface of the substrate. When a voltage is applied to the signal electrode S, electric field is generated and applied to the optical waveguide WG in the Z direction, namely, the direction perpendicular to the surface of the substrate. This electric field causes the refractive index of the optical waveguide WG to change, and consequently, the phase of the light beam traveling through the optical waveguide WG changes.

A radio frequency (RF) electrode and a direct current (DC) electrode are provided to the optical waveguide WG. A high-frequency signal having a 10 GHz bandwidth is input to the RF electrode to carry out high-speed optical modulation. For such high-speed modulation, a coplanar waveguide (CPW) structure which can provide broadband transmission characteristics is adopted in the RF electrode. The DC electrode is used to control the optical phase of the Mach-Zehnder (MZ) interferometer. The DC electrode generally employs a CPW structure like the RF electrode. See, for example, Patent Document 1 presented below.

An RF electrode structure comprised of a coplanar electrode, a microstrip electrode, and an electrode conversion part is proposed. See, for example, Patent Document 2 presented below. An RF electrode in which a microstrip line is electrically connected to a coplanar waveguide is also known. See, for example, Patent Document 3 presented below.

RELATED PUBLICATIONS

Patent Document 1: Japanese Patent Application Laid-open Publication No. 2013-238785
Patent Document 2: Japanese Patent Application Laid-open Publication No. 2016-14693
Patent Document 3: U.S. Pat. No. 5,208,697

SUMMARY

According to one aspect of the disclosure, an optical device includes an optical waveguide formed of a crystal thin film having an electro-optic effect, an RF electrode configured to apply a high-frequency voltage to the optical waveguide, and a DC electrode configured to apply a DC voltage to the optical waveguide, wherein the RF electrode has a coplanar electrode configuration, and the DC electrode has a microstrip configuration.

The object and advantages of the invention will be realized and attained by means of the elements and combinations particularly pointed out in the claims. It is to be understood that both the foregoing general description and the following detailed description are exemplary and explanatory and are not restrictive to the invention as claimed.

BRIEF DESCRIPTION OF DRAWINGS

FIG. 2 is a plan view of a schematically illustrated optical modulator having LN thin-film optical waveguides;
FIG. 4A illustrates in a cross-sectional view a DC electrode of the optical modulator according to an embodiment;
FIG. 4B illustrates in a cross-sectional view an RF electrode of the optical modulator according to an embodiment;
FIG. 6A illustrates a fabrication process of an optical modulator following the step of FIG. 5D according to an embodiment;
FIG. 6B illustrates a fabrication process of an optical modulator according to an embodiment;
FIG. 9 illustrates a relationship between thickness of the RF electrode and high-frequency characteristic.

DESCRIPTION OF EMBODIMENTS

Figure 1:
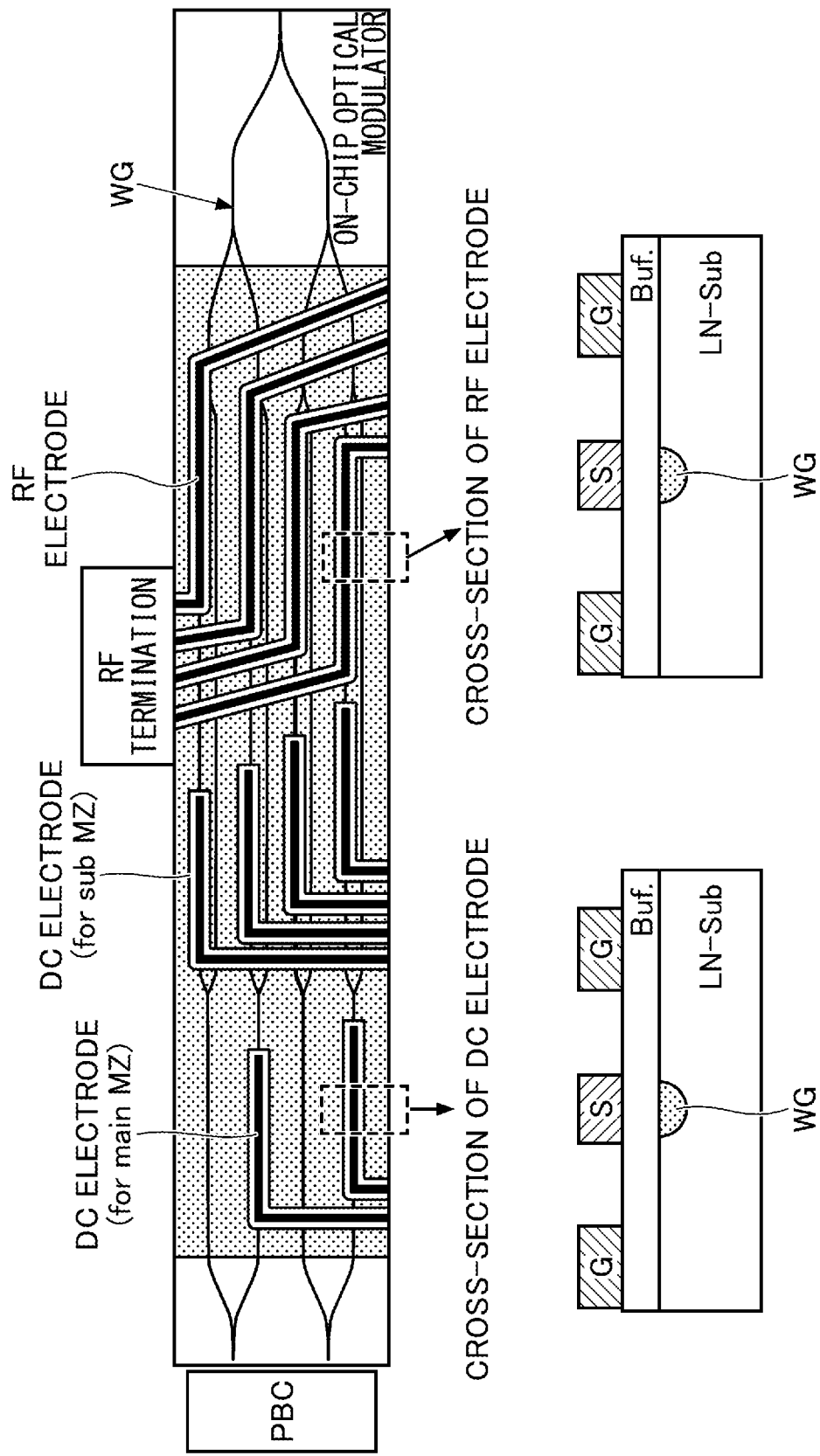
FIG. 1 is a schematic diagram of a typical optical modulator having titanium-diffused optical waveguides.

The optical waveguide WG of a conventional modulator, as illustrated in FIG. 1, is fabricated by diffusing a metal such as titanium (Ti) from the surface of a substrate. Because light confinement of a metal-diffused optical waveguide WG is not so strong, the electric-field application efficiency is insufficient, and a higher drive voltage is required. To solve this inconvenience, an optical waveguide formed of an LN thin film may be used, as illustrated in FIG. 2. Because the LN thin film waveguide has stronger light confinement, compared with the Ti-diffused waveguide, the electric field application efficiency is improved and the drive voltage can be reduced. However, light propagation loss may increase in the LN thin film waveguide due to the surface roughness, and insertion loss may increase. The present disclosure proposes an optical device operable at a low RF-drive voltage and having a less insertion loss.

Figure 3:
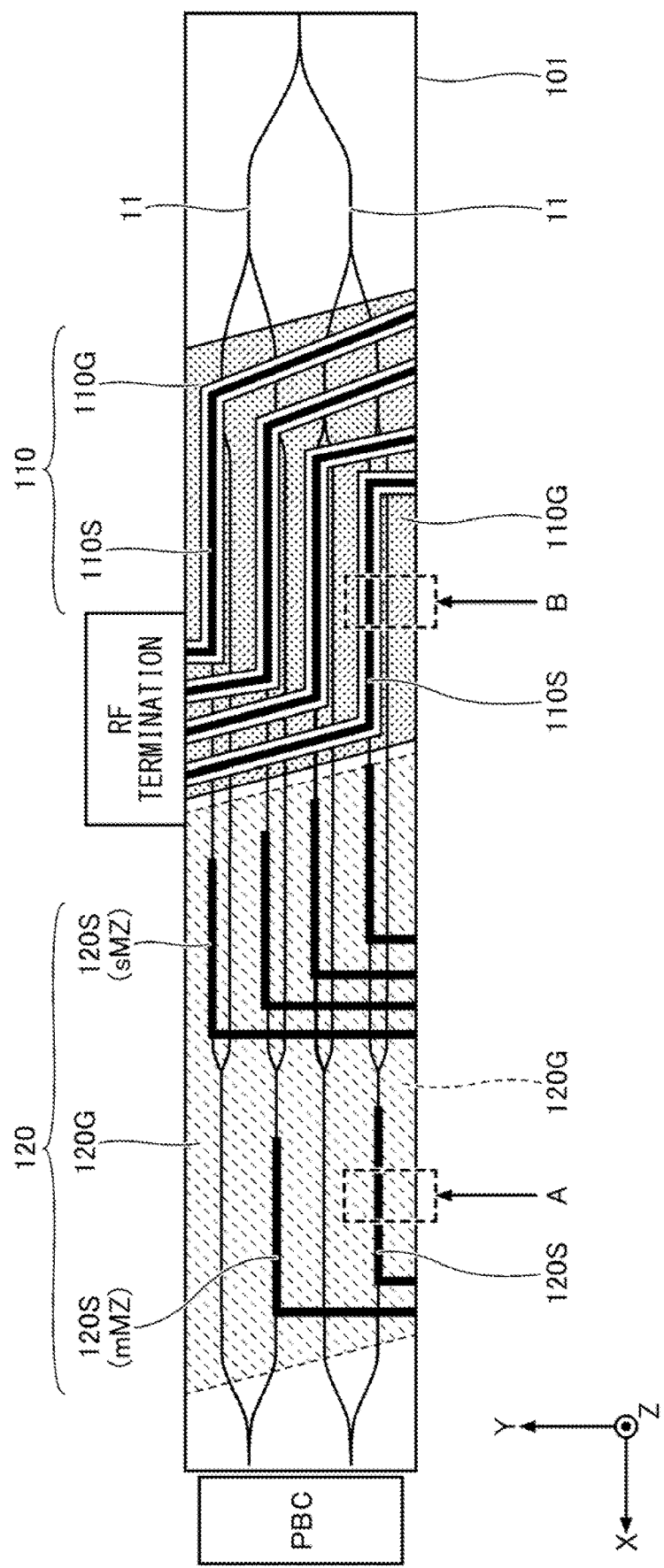
FIG. 3 is a plan view of a schematically illustrated optical modulator according to an embodiment.

FIG. 3 is a schematic plane view of an optical modulator 10 according to an embodiment. The optical modulator 10 is one example of the optical device. The configurations described below are applicable to other optical devices including an optical switch and an optical filter, or applicable to an integrated circuit (IC) chip on which such an optical device and other devices such as a laser diode or photodiodes are integrated.

The optical modulator 10 is an MZ optical modulator formed of an optical waveguide 11 on the substrate 101. For convenience of explanation, the propagation direction of light is the X direction, the height direction of the optical modulator 10 is the Z direction, and the direction perpendicular to both the X direction and the Z direction is the Y direction.

The optical waveguide 11 is, for example, a ridge-type thin film waveguide having strong light confinement, which will be described in more detail later. By enhancing the light confinement, the electric-field application efficiency is improved and the voltage required to drive the optical modulator 10 is reduced.

At one end (for example, on the −X side) of the optical modulator 10, the optical waveguide 11 is split into two, and an IQ modulator for X polarization and an IQ modulator for Y polarization are formed in parallel. At the other end (for example, on the +X side) of the light modulator 10, the two IQ modulators are combined into one by a polarization beam combiner (PBC). In this example, the light modulator 10 is a 4-channel modulator based on polarization multiplex IQ modulation.

In each of the X and Y polarizations parts, the IQ modulator has an I channel and a Q channel. The entirety of the IQ modulator is referred to as a parent MZ or a master MZ (mMZ). An MZ interferometer that forms an I-channel or a Q-channel in each IQ modulator is called a child MZ or a sub-MZ (sMZ).

The optical modulator 10 has an RF electrode 110 and a DC electrode 120. The RF electrode 110 has a coplanar waveguide configuration, while the DC electrode 120 has a microstrip configuration.

The RF electrode 110 includes RF signal electrodes 110S and RF ground electrodes 110G. The RF signal electrodes 110S and the RF ground electrodes 110G are formed in the same plane above the optical waveguide 11, viewing in the layer stacking direction. The RF signal electrode 110S is configured to input an RF signal to the optical waveguide 11 of the child MZ forming each channel.

The DC electrode 120 includes a DC signal electrode 120S and a DC ground electrode 120G. The DC signal electrode 120S is formed in the same layer as the RF signal electrode 110S and the RF ground electrode 110G. The DC ground electrode 120G is positioned below the DC signal electrode 120S with insulating layers (that include a buffer layer 102, a crystal thin film 103, and a buffer layer 104, as will be described below referring to FIG. 4A) interposed therebetween.

A high-speed electric signal with a bandwidth of several tens of GHz is input to the RF signal electrode 110S, and high-speed optical modulation is performed. Therefore, as the RF electrode 110, a coplanar structure which can achieve broadband transmission characteristics is employed. Compared with a microstrip structure, there are many shape-related parameters such as strip width and slot width in the coplanar structure. Accordingly, a phase constant, a characteristic impedance, and so on can be adjusted over a wide range. One end of the RF signal electrode 110S is terminated.

A DC bias voltage is applied to the DC signal electrode 120S in order to control the phase of the MZ interferometer. The DC signal electrode 120S includes a DC signal electrode 120S (mMZ) for applying a DC bias to the optical waveguide 11 of the parent MZ, and a DC signal electrode 120S (sMZ) for applying a DC bias to the optical waveguide 11 of the child MZ.

A DC bias that gives a 90-degree phase difference between the I channel and the Q channel is applied to the DC signal electrode 120S of the parent MZ (mMZ) during operations. A DC bias voltage applied to the DC signal electrode 120S of the child MZ (sMZ) is to maintain the operating point of the optical modulator 10 at a desired point (for example, a point where the light intensity is halved) in each channel.

A wideband characteristic is not required for the DC electrode 120, but the DC electrode 120 requires a high efficiency for applying an electric field to the optical waveguide. Accordingly, a microstrip structure is employed for the DC electrode 120. With a microstrip line, most of the electric field is confined in the substrate, and accordingly, the electric-field application efficiency is improved. As the electric-field application efficiency is improved, the length of the DC electrode 120 required to apply a desired operating voltage can be reduced. By shortening the DC electrode 120, the total length of the optical waveguide 11 is reduced. The chip size of the optical modulator becomes smaller, and light propagation loss can be reduced.

Hence, an optical modulator 10 that has reduced insertion loss and that is operable at a low RF drive voltage is achieved.

FIG. 4A is a cross-sectional view of a DC electrode of the optical modulator 10, which corresponds to the cross-section of area "A" enclosed by the dashed line and taken along the Y-Z plane of FIG. 3. FIG. 4B is a cross-sectional view of an RF electrode of the optical modulator 10, which corresponds to the cross-section of area "B" enclosed by the dashed line and taken along the Y-Z plane of FIG. 3.

The optical modulator 10 is formed over the substrate 101. The substrate 101 is, for example, a Z-cut LN substrate. Depending on the material used for the optical waveguide 11, other crystal substrates that exhibit the Pockels effect (or the linear electro-optic effect), such as a LiTaO$_3$ substrate, may be used.

In the RF electrode area of FIG. 4B, a ridge-type optical waveguide 11 formed of a dielectric crystal thin film 103 is provided over the substrate 101 via a buffer layer 102 therebetween. The buffer layer 102 is, for example, a silicon oxide (SiO$_2$) layer. Although a crystal thin film 103 of LN is used in this example, other materials such as LiTaO$_3$, a mixed crystal of LiNbO$_3$ and LiTaO$_3$, or the like may be used. Regardless of the crystal material used, the c-axis of the crystal thin film 103 is preferably oriented perpendicular to the substrate 101.

The entirety of the optical waveguide 11 and the crystal thin film 103 are covered with the buffer layer 104. Preferably, the refractive index difference between the buffer layer 104 and the optical waveguide 11 is as great as possible. The buffer layer 104 may be made of, for example, $SiO_2$. By providing a large difference in refractive index between the buffer layer 104 and the optical waveguide 11, the light confinement in the optical waveguide 11 is enhanced.

The RF signal electrode 110S is provided over the optical waveguide 11 via the buffer layer 104 therebetween. RF ground electrodes 110G are provided on both sides of the RF signal electrode 110S with a predetermined gap from the RF electrode 110S to form a coplanar structure of the RF electrode 110 (see FIG. 3).

An electric field is applied from the RF signal electrode 110S in a direction perpendicular to the substrate 101, and electric lines of force can be concentrated onto the optical waveguide 11. The coplanar structure of the RF electrode 110 with a well-defined gap between adjacent electrodes ensures wideband transmission characteristics. In one example, the gap between the RF signal electrode 110S and the RF ground electrode 110G is 10 µm.

In FIG. 4A illustrating the DC electrode structure, a DC ground electrode 120G is provided on the substrate 101. The ridge-type optical waveguide 11 is formed by a crystal thin film 103 over the DC ground electrode 120G via the buffer layer 102 therebetween. A DC signal electrode 120S is provided over the optical waveguide 11 via a buffer layer 104 therebetween.

The DC signal electrode 120S and the DC ground electrode 120G together form a microstrip DC electrode 120 (see FIG. 3). The microstrip DC electrode 120 efficiently applies a DC electric field to the optical waveguide 11.

FIG. 5A to FIG. 5F and FIG. 6A to FIG. 6D illustrate a fabrication process of the optical modulator 10. The left side of the pages illustrates the cross-sectional views of the DC electrode, and the right side of the pages illustrates the cross-sectional views of the RF electrode.

Figure 5A:
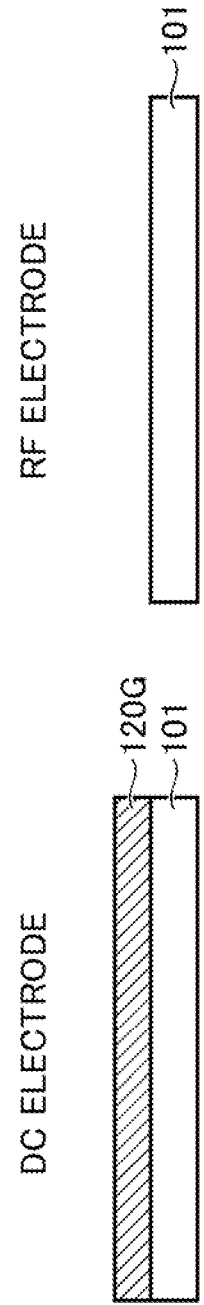
FIG. 5A illustrates a fabrication process of an optical modulator according to an embodiment.

In FIG. 5A, a DC ground electrode 120G is formed in a predetermined area on the substrate 101. More specifically, the DC ground electrode 120G is formed in the area where the DC electrode 120 is to be provided in the later step. The thickness of the DC ground electrode 120G is, for example, several hundred nanometers to 1 micron.

Figure 5B:
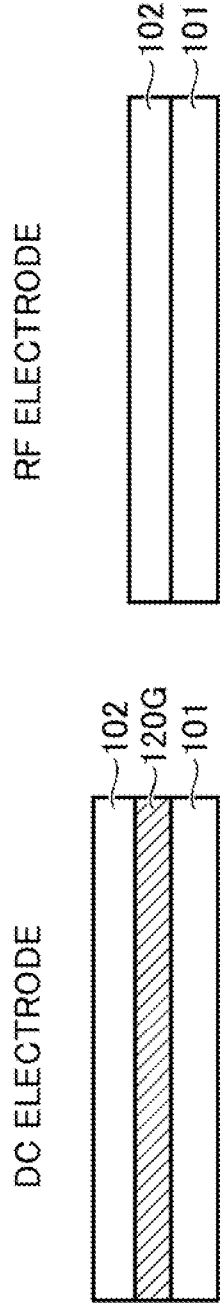
FIG. 5B illustrates a fabrication process of an optical modulator according to an embodiment.

In FIG. 5B, a buffer layer 102 is formed over the entire surface of the DC ground electrode 120G and the entire surface of the substrate 101 by a sputtering method or the like. The DC ground electrode 120G may form a step in the upper buffer layer 102; however, the step can be planarized in a subsequent step and, thus, does not affect the fabrication of the optical waveguide 11 and the electrodes.

Figure 5C:
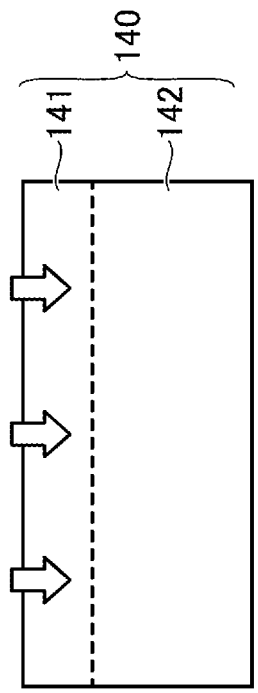
FIG. 5C illustrates a fabrication process of an optical modulator according to an embodiment.

In FIG. 5C, a substrate 140 is prepared to provide a crystal thin film for forming an optical waveguide. In this example, the substrate 140 is an LN substrate. One of the main surfaces of the substrate 140 is irradiated by ion beams to create an ion-implanted layer 141. By controlling the ion injection energy, ions can be implanted to a desired depth from the surface. Such ions may be hydrogen ions, helium ions, argon ions, or other suitable ions. The rest of the substrate without ion implantation becomes a support layer 142.

Figure 5D:
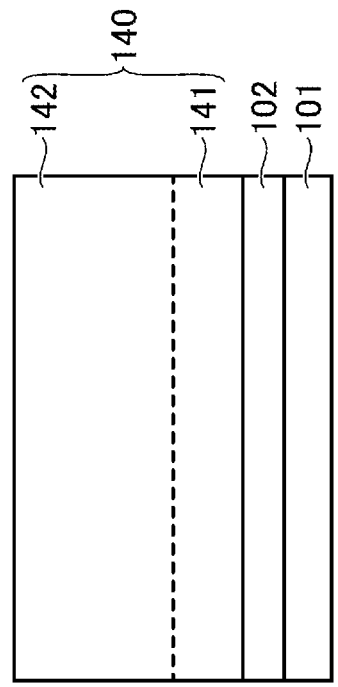
FIG. 5D illustrates a fabrication process of an optical modulator according to an embodiment.

In FIG. 5D, the ion-implanted layer 141 of the substrate 140 is bonded to the buffer layer 102. Prior to the bonding, surface activation may be performed on the surface of the ion-implanted layer 141 or the buffer layer 102 with wet chemicals, ozone, plasma, or the like.

In FIG. 6A, heat treatment such as annealing is performed on the bonded wafer to remove the support layer 142 from the wafer. By the heat treatment, microcavities are produced at the interface between the ion-implanted layer 141 and the support layer 142, and the support layer 142 can be separated from the ion-implanted layer 141. After the removal of the support layer 142, the separated surface of the ion-implanted layer 141 may be planarized by, for example, chemical mechanical polishing. By this planarization, the step formed by the DC ground electrode 120G can be flattened.

In FIG. 6B, the ion-implanted layer 141 is etched to form a ridge of the optical waveguide 11 of the LN crystal thin film 103. The height of the ridge is, for example, 200 nm to 300 nm, and the width is 300 nm to 500 nm.

Figure 6C:
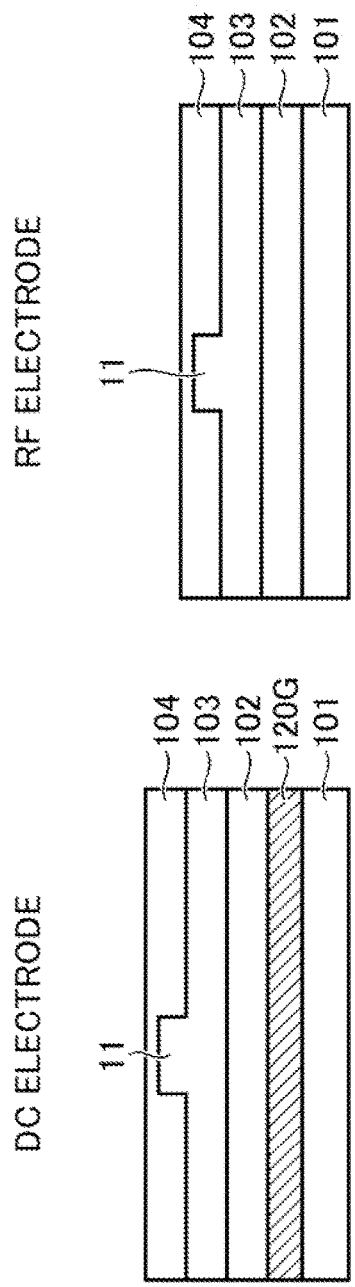
FIG. 6C illustrates a fabrication process of an optical modulator according to an embodiment.

In FIG. 6C, a buffer layer 104 is formed on the entire surface by sputtering or any other suitable method. The buffer layer 104 may be, for example, a $SiO_2$ film with a thickness of about 0.5 µm to 1 µm. When light confinement of the optical waveguide 11 is too strong, higher-order modes may be excited, and undesirable crosstalk or degradation of extinction ratio may occur. Therefore, in consideration of modulation efficiency, the cross-sectional area of the optical waveguide 11, the refractive index difference between the buffer layer 104 and the optical waveguide 11, and other parameters are designed.

Figure 6D:
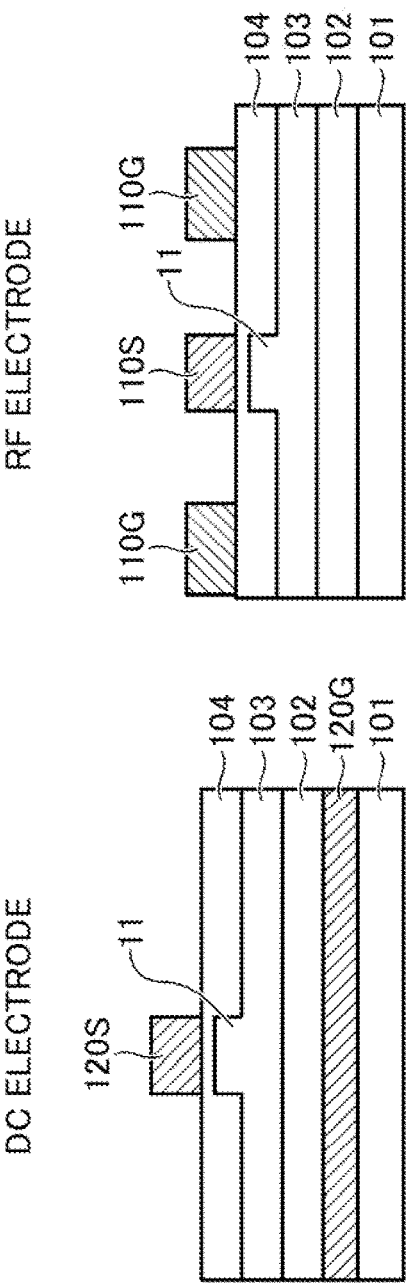
FIG. 6D illustrates a fabrication process of an optical modulator according to an embodiment.

In FIG. 6D, electrodes are formed. In the area to which DC bias is applied, a DC signal electrode 120S is formed over the optical waveguide 11. In the area where RF signals are input, a coplanar structure of an RF signal electrode 110S and RF ground electrodes 110G is formed over the optical waveguide 11.

The coplanar structure with satisfactory wideband characteristics is provided to the RF electrode 110, while the DC electrode 120 has a microstrip structure that facilitates the efficient application of the electric field. Because the microstrip structure allows the DC voltage to be reduced, the length of the DC signal electrode 120S, and accordingly, the total length of the optical waveguide 11 can be shortened, and the insertion loss can be reduced.

<First Modification>

Figure 7A:
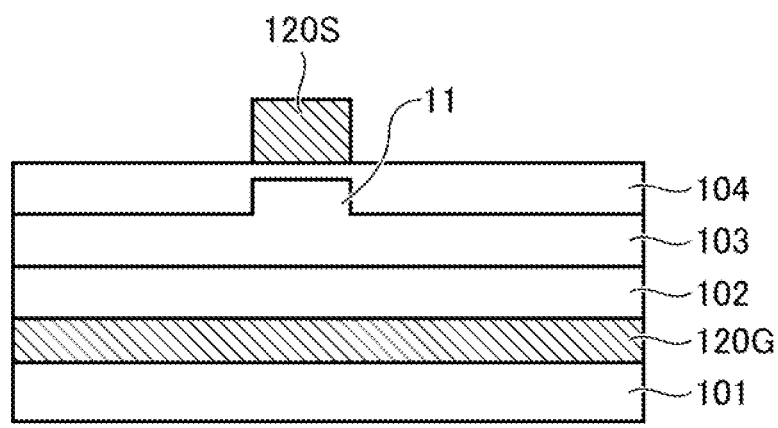
FIG. 7A is a schematic cross-sectional view of a DC electrode used in a first modification of the optical modulator of the embodiment.
Figure 7B:
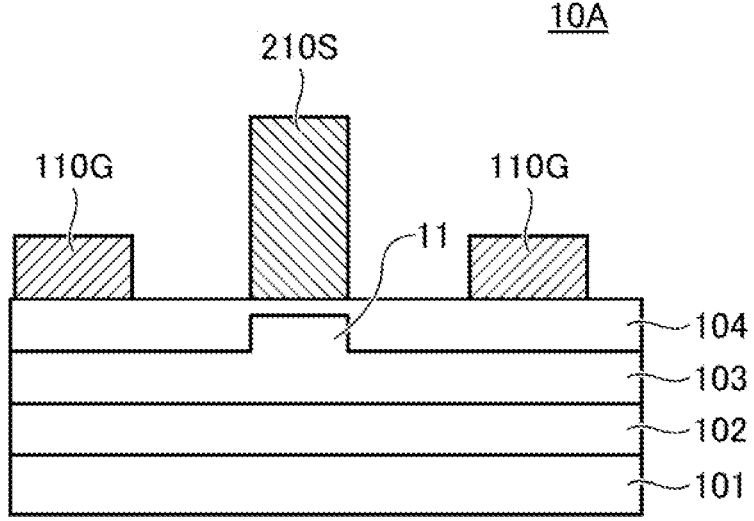
FIG. 7B is a schematic cross-sectional view of an RF electrode used in the first modification of the optical modulator of the embodiment.

FIG. 7A and FIG. 7B illustrate electrode structures of an optical modulator 10A, which is a first modification of the optical modulator 10. FIG. 7A is a cross-sectional view of the DC electrode, and FIG. 7B is a cross-sectional view of the RF electrode. In the first modification, the thickness of the RF signal electrode 210S is greater than the thickness of the DC signal electrode 120S. The rest of the cross-sectional configuration is the same as that illustrated in FIG. 4. The same elements are denoted by the same reference numerals, and redundant description will be omitted. The plan layout of the RF signal electrode 210S and the DC signal electrode 120S is the same as that illustrated in FIG. 3.

With the DC electrode 120 of a microstrip type, the efficiency of applying an electric field is satisfactory, and it is unnecessary to increase the thickness of the DC signal electrode 20S. There is no inconvenience arising even if the thickness of the DC signal electrode 120S is maintained as designed in FIG. 4. Meanwhile, when the RF signal electrode 210S is set to the same thickness as the DC signal electrode 120S, optical loss may increase at high frequencies and the bandwidth may be degraded. Therefore, as illustrated in FIG. 7A and FIG. 7B, the thickness of the RF signal electrode 210S is set greater than that of the DC signal electrode 120S.

For instance, the thickness of the DC signal electrode 120S may be 1 micrometer to several micrometers (μm), and the thickness of the RF signal electrode 210S may be 3 μm or more. Preferably, the thickness of the RF signal electrode 210S is 3 μm to 10 μm. As will be described later, by setting the thickness or the height of the RF signal electrode 210S to 3 μm or more, the cross-sectional area of the RF signal electrode 210S increases, and the resistance can be reduced, which leads to expansion of the bandwidth. When the height of the RF signal electrode 210S is 10 μm or more, the aspect ratio becomes too large to fabricate an electrode. Even when an electrode with such a high aspect ratio can be fabricated, the structure is unstable, and the product reliability may be adversely affected.

The thickness of the RF signal electrode 210S can be increased by any suitable method. For example, after the first layer of the RF signal electrode, the RF ground electrode 110G, and the DC signal electrode 120S are formed simultaneously by combination of vapor deposition or sputtering and lift-off, the second layer of the RF signal electrode may be formed by plating only in the area of the RF signal electrode. Alternatively, after the first layer of the RF signal electrode, the RF ground electrode 110G, and the DC signal electrode 120S are formed simultaneously by plating, the second plating may be performed only on the area of the RF signal electrode.

With the configuration of the first modification, the bandwidth characteristics of the optical modulator 10A can be improved.

<Second Modification>

Figure 8A:
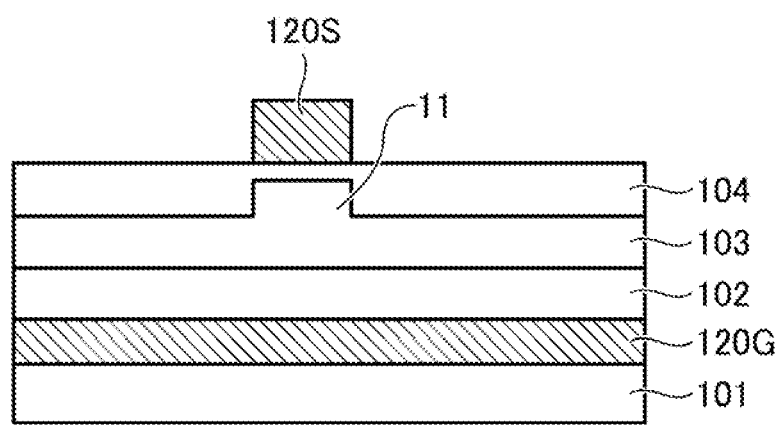
FIG. 8A is a schematic cross-sectional view of a DC electrode used in a second modification of the optical modulator of the embodiment.
Figure 8B:
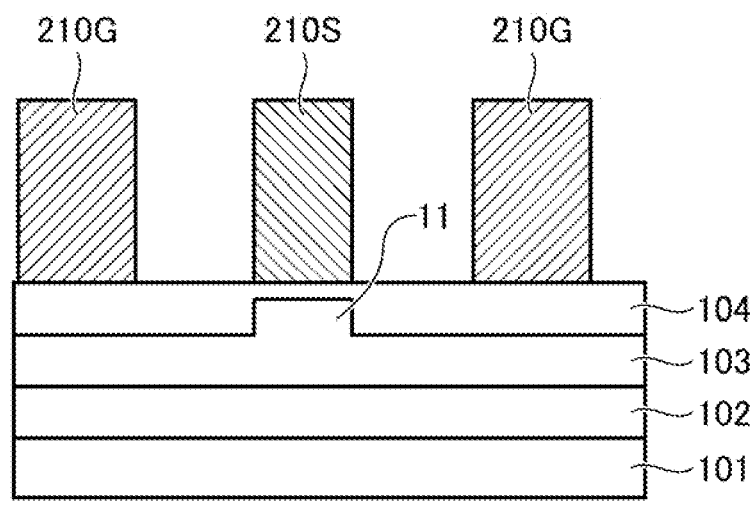
FIG. 8B is a schematic cross-sectional view of an RF electrode used in the second modification of the optical modulator of the embodiment.

FIG. 5A and FIG. 5B illustrate electrode structures of an optical modulator 10B, which is a second modification of the optical modulator 10. FIG. 8A is a cross-sectional view of the DC electrode, and FIG. 8B is a cross-sectional view of the RF electrode. In the above-described first modification, the thickness of the RF ground electrode 110G is the same as that of the DC signal electrode 120S. In the second modification, the thickness of the RF ground electrode 210G is set greater than the thickness of the DC signal electrode 120S. The rest of the cross-sectional configuration is the same as that illustrated in FIG. 7. The same elements are denoted by the same reference numerals, and redundant description will be omitted. The plan layout of the RF signal electrode 210S and the DC signal electrode 120S is the same as that illustrated in FIG. 3.

By increasing the thickness of the RF ground electrode 210G, the high frequency characteristics can be maintained in the satisfactorily state. Besides, the RF signal electrode 210S and the RF ground electrode 210G can be formed in a single process.

FIG. 9 illustrates the relationship between the thickness of the RF signal electrode 210S and high frequency characteristic. It is preferable for a 100G-standardized optical modulator to have an S21 characteristic at or higher than −5 dB at a frequency of 3 GHz. To achieve this characteristic, the thickness of the RF signal electrode 210S is preferably 3 μm or more, as have been described above. From the viewpoint of the stability of the electrode structure and the operational reliability, the thickness of the RF signal electrode 210S may range from 3 μm to 10 μm.

<Third Modification>

Figure 10A:
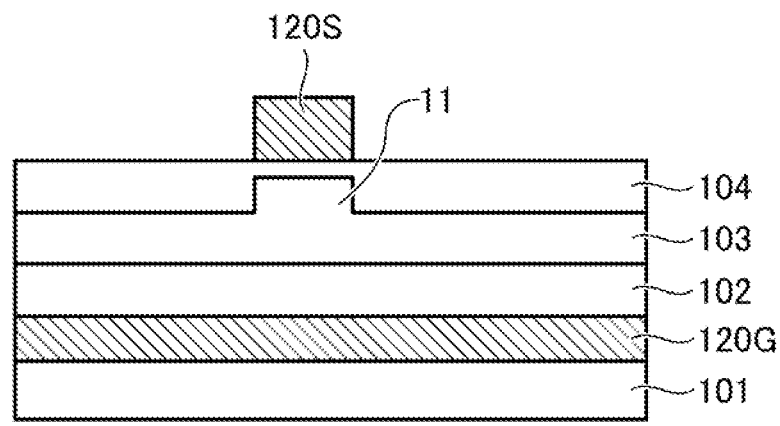
FIG. 10A is a schematic cross-sectional view of a DC electrode used in a third modification of the optical modulator of the embodiment.
Figure 10B:
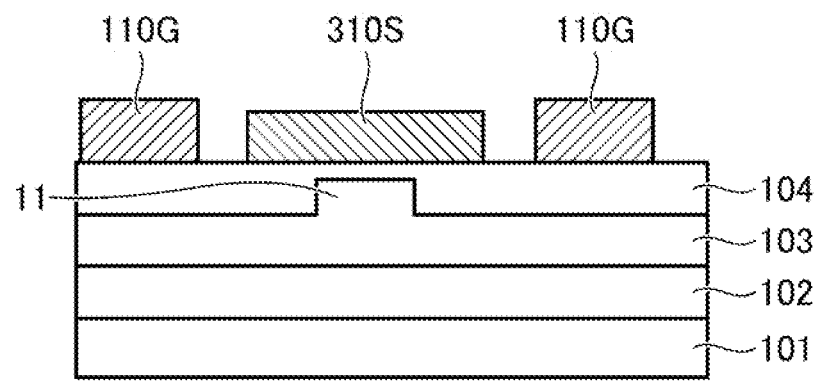
FIG. 10B is a schematic cross-sectional view of an RF electrode used in the third modification of the optical modulator of the embodiment.

FIG. 10A and FIG. 10B illustrate electrode structures of an optical modulator 10C, which is a third modification of the optical modulator 10. FIG. 10A is a cross-sectional view of the DC electrode, and FIG. 10B is a cross-sectional view of the RF electrode. In the third modification, the electrode width differs between the DC signal electrode 120S and the RF signal electrode 310S. The rest of the cross-sectional configuration is the same as that illustrated in FIG. 4. The same elements are denoted by the same reference numerals, and redundant description will be omitted.

The optimum width of the DC signal electrode 120S is determined so as to maximize the efficiency in applying an electric field to the optical waveguide 11 and to minimize the half-wavelength voltage Vπ of the DC bias. This design factor applies to all the configurations of the embodiment and the first to third modifications. The width of the DC signal electrode 120S is almost the same or close to the mode field diameter of the light beam travelling through the optical waveguide 11, which is about 3 μm as an example.

The optimum width of the RC signal electrode 310S is determined so as to satisfy the conditions that the high frequency impedance matches the impedance of the external circuit, and that the high frequency S21 characteristics are good, in addition to the requirement of a small Vπ. By increasing the width of the RF signal electrode 310S, the cross-sectional area is increased and the impedance can be lowered.

The gap between the RF signal electrode 310S and the RF ground electrode 110G is appropriately determined such that the desired bandwidth characteristics can be achieved. In this example, the gap between the RF signal electrode 310S and the RF ground electrode 110G is about 10 μm. When the widened RF signal electrode 310S is provided to one of the optical waveguides 11 that form an MZ interferometer, the distance between the two optical waveguides of the MZ interferometer may be adjusted.

By setting the optimum widths for the DC signal electrode 120S and the RF signal electrode 310S, an optical modulator 10C having a small RF drive voltage and a small insertion loss is achieved. The DC signal electrode 120S and the RF signal electrode 310S having different widths can be fabricated simultaneously in the same process, and there is no need to change the fabrication process or add an extra step.

<Applications to Optical Transceiver>

Figure 11:
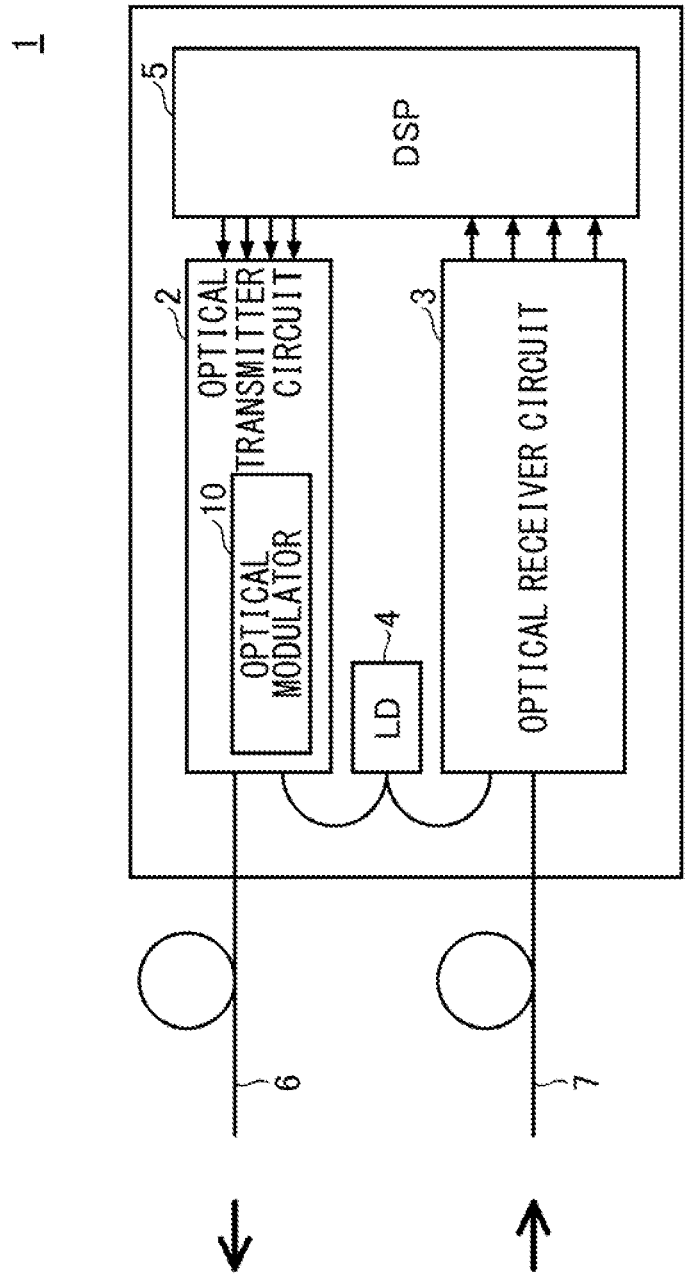
FIG. 11 is a schematic diagram of an optical transceiver to which an optical device of the embodiment is applied.

FIG. 11 is a schematic diagram of an optical transceiver 1 to which the optical modulator 10 is applied. In this example, the optical transceiver 1 includes an optical transmitter circuit 2, an optical receiver circuit 3, a digital signal processor (DSP) 5, and a laser diode (LD) 4.

The optical transmitter circuit 2 includes the optical modulator 10 (or any one of optical modulators 10A to 10C which may be collectively referred to as "optical modulator 10") of the embodiment. The optical transmitter circuit 2 may include a driver circuit for inputting a high-speed drive signal to the RF electrode 110 of the optical 10.

The DSP 5 may generate an electric field signal (defined by amplitude and phase) that represents the logical value of the high-speed data signal input to the RF electrode 110. A DC bias source for generating a bias voltage applied to the DC electrode 120 and a control circuit for controlling the bias value may be provided in a logical device such as a field programmable gate array, or alternatively, they may be included in the DSP 5.

The light beam emitted from the LD 4 is modulated with the data signal at the optical modulator 10, and the modulated optical signal is output to the optical transmission line 6 formed by an optical fiber.

The optical receiver circuit 3 converts an optical signal received from the optical transmission line 7 (e.g., an optical fiber) into an electric signal. The optical receiver circuit 3 is, for example, a coherent receiver circuit that uses a portion of the light beam emitted from the LD4 as the reference light (or the local oscillation light) to detect and separate the orthogonal phase components (I-phase and Q-phase) for the orthogonal polarization components from the received optical signal. The separated light components are converted into electrical signals and supplied to the DSP 5 in which signal processing such as waveform shaping and equalization are performed to decode the transmitted signal.

The optical modulator 10 adopts a coplanar structure for the RF electrode and adopts a microstrip structure for the DC electrode. This configuration can maintain satisfactory high-frequency characteristics and reduce a RF drive voltage, while the length and the insertion loss of the DC electrode are reduced.

The above-described embodiment and modifications are merely examples, and various substitutions or alterations are possible. The configurations of the embodiment and modifications are applicable not only to an optical modulator, but also to other optical devices, such as optical switches or optical filters, or to an optical integrated circuit chip in which these optical devices are integrated together with a tunable laser source.

The configurations of the optical modulator 10 are applicable not only to a dual polarized modulation scheme, but also to other optical modulation schemes carried out under application of a DC bias and high-frequency input signals, such as 16-quadrature amplitude modulation (QAM) or quadrature phase shift keying (QPSK). The optical modulator 10 is not limited to an LN modulator, but applicable to an optical device using other electro-optic (EO) crystals or EO polymers having the EO effect. The optical waveguide 11 is not limited to the embedded ridge waveguide, and other types of optical waveguides including a square waveguide, a deep ridge type optical waveguide, etc. may be used.

Some or all of the configurations of the embodiment and the first to third modifications can be combined with one another. For example, both the width and the height of the RF signal electrode may be different from the width and the height of the DC signal electrode. Such a combination can also achieve a lowered RF drive voltage and the reduced insertion loss.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present inventions have been described in detail, it should be understood that the various changes, substitutions, and alterations could be made hereto without departing from the spirit and scope of the invention.

What is claimed is:

1. An optical device comprising:
    a ridge-type optical waveguide formed of a crystal thin film having an electro-optic effect;
    an RF electrode configured to apply a high-frequency voltage to the ridge-type optical waveguide; and
    a DC electrode configured to apply a DC voltage to the ridge-type optical waveguide,
        wherein the RF electrode has a coplanar electrode configuration, and the DC electrode has a microstrip electrode configuration,
        wherein the RF electrode having the coplanar electrode configuration includes an RF signal electrode disposed above the ridge-type optical waveguide and an RF ground electrode that is coplanar with the RF signal electrode, and the DC electrode having the microstrip electrode configuration includes a DC signal electrode disposed above the ridge-type optical waveguide and a DC ground electrode disposed between the ridge-type optical waveguide and a substrate over which the ridge-type optical waveguide is formed,
        wherein the DC signal electrode is coplanar with the RF signal electrode and the RF ground electrode, and a width of the DC signal electrode is different from a width of the RF signal electrode, and
    wherein the crystal thin film within an area of the DC electrode has a surface shaped to accommodate the DC electrode.

2. The optical device as claimed in claim 1,
    wherein a thickness of the RF ground electrode is greater than a thickness of the DC signal electrode.

3. The optical device as claimed in claim 1, wherein a thickness of the RF signal electrode is greater than or equal to 3 µm, and less than 10 µm.

4. The optical device as claimed in claim 2, wherein a thickness of the RF signal electrode is greater than or equal to 3 µm, and less than 10 µm.

5. The optical device as claimed in claim 1,
    wherein the width of the RF signal electrode is different from a width of the RF ground electrode.

6. The optical device as claimed in claim 1,
    wherein the width of the DC signal electrode is configured to maximize an efficiency in applying an electric field to the ridge-type optical waveguide and minimize a half-wavelength voltage V$\pi$ of an DC bias.

7. The optical device as claimed in claim 1, further comprising:
    a buffer layer provided between the ridge-type optical waveguide and a bottom portion of the DC electrode having the microstrip electrode configuration,
    wherein the buffer layer within an area of the DC electrode has a planarized surface to accommodate the bottom portion of the DC electrode.

8. The optical device as claimed in claim 1, wherein the crystal thin film within an area of the DC electrode has a surface shaped to accommodate a bottom portion of the DC electrode having the microstrip electrode configuration.

9. An optical transceiver comprising:
    an optical transmitter circuit; and
    an optical receiver circuit,
    wherein the optical transmitter circuit includes
        an optical modulator that includes a ridge-type optical waveguide formed of a crystal thin film having an electro-optic effect,
        an RF electrode configured to apply a high-frequency voltage to the ridge-type optical waveguide, and
        a DC electrode configured to apply a DC voltage to the ridge-type optical waveguide,
        wherein the RF electrode has a coplanar electrode configuration, and the DC electrode has a microstrip electrode configuration,
        wherein the RF electrode having the coplanar electrode configuration includes an RF signal electrode disposed above the ridge-type optical waveguide and an RF ground electrode that is coplanar with the RF signal electrode, and the DC electrode having the microstrip electrode configuration includes a DC signal electrode disposed above the ridge-type optical waveguide and a DC ground electrode disposed between the ridge-type optical waveguide and a substrate over which the ridge-type optical waveguide is formed, and wherein the DC signal electrode is coplanar with the RF signal electrode and the RF ground electrode, and a width of the DC signal electrode is different from a width of the RF signal electrode, wherein the crystal thin film within an area of the DC electrode has a surface shaped to accommodate the DC ground electrode.

10. The optical transceiver as claimed in claim 9, further comprising:
a buffer layer provided between the ridge-type optical waveguide and the DC ground electrode,
wherein the buffer layer within an area of the DC electrode has a surface shaped to accommodate the DC ground electrode.

11. An optical transceiver comprising:
an optical receiver circuit; and
an optical transmitter circuit including
an optical modulator that includes a ridge-type optical waveguide formed of a crystal thin film having an electro-optic effect,
an RF electrode configured to apply a high-frequency voltage to the ridge-type optical waveguide, and
a DC electrode configured to apply a DC voltage to the ridge-type optical waveguide,
wherein:
the RF electrode has a coplanar electrode configuration, and the DC electrode has a microstrip electrode configuration,
the RF electrode having the coplanar electrode configuration includes an RF signal electrode disposed above the ridge-type optical waveguide and an RF ground electrode that is coplanar with the RF signal electrode, and the DC electrode having the microstrip electrode configuration includes a DC signal electrode disposed above the ridge-type optical waveguide and a DC ground electrode disposed between the ridge-type optical waveguide and a substrate over which the ridge-type optical waveguide is formed, and
wherein the DC signal electrode is coplanar with the RF signal electrode and the RF ground electrode, and a width of the DC signal electrode is different from a width of the RF signal electrode, the optical transceiver further comprising:
a buffer layer provided between the ridge-type optical waveguide and the DC ground electrode,
wherein the buffer layer within an area of the DC electrode has a surface shaped to accommodate the DC ground electrode.

12. The optical device as claimed in claim 11, wherein the crystal thin film within an area of the DC electrode has a surface shaped to accommodate the DC ground electrode.

13. An optical device comprising:
a ridge-type optical waveguide formed of a crystal thin film having an electro-optic effect;
an RF electrode configured to apply a high-frequency voltage to the ridge-type optical waveguide; and
a DC electrode configured to apply a DC voltage to the ridge-type optical waveguide,
wherein the RF electrode has a coplanar electrode configuration, and the DC electrode has a microstrip electrode configuration,
wherein the RF electrode having the coplanar electrode configuration includes an RF signal electrode disposed above the ridge-type optical waveguide and an RF ground electrode that is coplanar with the RF signal electrode, and the DC electrode having the microstrip electrode configuration includes a DC signal electrode disposed above the ridge-type optical waveguide and a DC ground electrode disposed between the ridge-type optical waveguide and a substrate over which the ridge-type optical waveguide is formed,
wherein the DC signal electrode is coplanar with the RF signal electrode and the RF ground electrode, and a width of the DC signal electrode is different from a width of the RF signal electrode, the optical device further comprising:
a buffer layer provided between the ridge-type optical waveguide and a bottom portion of the DC electrode having the microstrip electrode configuration,
wherein the buffer layer within an area of the DC electrode has a planarized surface to accommodate the bottom portion of the DC electrode.

* * * * *